(12) United States Patent
Melville, Jr. et al.

(10) Patent No.: US 11,116,201 B1
(45) Date of Patent: Sep. 14, 2021

(54) BUCKET MOUSE TRAP

(71) Applicants: Douglas F. Melville, Jr., Simsbury, CT (US); John David Niel, Torrington, CT (US)

(72) Inventors: Douglas F. Melville, Jr., Simsbury, CT (US); John David Niel, Torrington, CT (US)

( * ) Notice: Subject to any disclaimer, the term of this patent is extended or adjusted under 35 U.S.C. 154(b) by 201 days.

(21) Appl. No.: 16/147,747

(22) Filed: Sep. 29, 2018

(51) Int. Cl.
*A01M 23/10* (2006.01)

(52) U.S. Cl.
CPC ......... *A01M 23/10* (2013.01); *A01M 2200/00* (2013.01)

(58) Field of Classification Search
CPC ...... A01M 23/02; A01M 23/04; A01M 23/08; A01M 23/10; A01M 23/06
USPC .................................. 43/69, 71, 74
See application file for complete search history.

(56) References Cited

U.S. PATENT DOCUMENTS

| | | | | |
|---|---|---|---|---|
| 124,838 A * | 3/1872 | Lyman | ................... | A01M 23/04 43/69 |
| 281,461 A * | 7/1883 | Cook | ................... | A01M 23/04 43/69 |
| 1,032,089 A * | 7/1912 | Spirikowicz | .......... | A01M 23/04 43/69 |
| 1,689,529 A * | 10/1928 | Knapp | ................... | A01M 23/02 43/65 |
| 1,727,666 A * | 9/1929 | Nicks | ................... | A01M 23/18 43/69 |
| 1,852,473 A * | 4/1932 | Nordmeyer | ........... | A01M 23/00 43/69 |
| 2,564,491 A * | 8/1951 | Martin | ................... | A01M 23/00 43/60 |
| 2,565,142 A * | 8/1951 | Mattingly | ............. | A01M 1/103 43/121 |
| 2,619,765 A * | 12/1952 | Sees | ....................... | A01M 23/12 43/64 |
| 3,528,191 A * | 9/1970 | Hand | ..................... | A01M 23/10 43/64 |
| 4,154,016 A * | 5/1979 | Reyes | ................... | A01M 23/12 43/69 |
| 4,241,531 A * | 12/1980 | Nelson | .................. | A01M 23/04 43/69 |
| 4,372,074 A * | 2/1983 | Arrabit | ................. | A01M 23/04 43/69 |

(Continued)

OTHER PUBLICATIONS

YouTube, "Drop In The Bucket Mouse Trap In Action With Motion Cameras. Mousetrap Monday," available at https://www.youtube.com/watch?v=85oQOB9cTrQ (Year: 2017).*

(Continued)

*Primary Examiner* — Lisa L Tsang
(74) *Attorney, Agent, or Firm* — Medley, Behrens & Lewis LLC; Lorri W. Cooper

(57) ABSTRACT

A mouse trap for use with a bucket having an upper rim, a side wall, and a bottom edge includes a top portion having a ledge for seating adjacent or over the upper rim of the bucket and a spiral ramp coupled to an outer edge of the top portion. The top portion has an opening with a movable roller disposed across the opening and the ledge substantially surrounds the opening of the top portion. The spiral ramp when in use extends down the side wall of the bucket from an area near or at the upper rim of the bucket to the bottom edge of the bucket.

16 Claims, 15 Drawing Sheets

(56) References Cited

U.S. PATENT DOCUMENTS

| | | | | |
|---|---|---|---|---|
| 4,662,101 | A * | 5/1987 | Fisher | A01M 23/04 |
| | | | | 43/69 |
| 5,094,027 | A * | 3/1992 | Smotherman | A01M 23/08 |
| | | | | 43/60 |
| 5,517,784 | A * | 5/1996 | Sedore | A01M 23/04 |
| | | | | 43/64 |
| 5,528,852 | A | 6/1996 | Sarff | |
| 5,996,274 | A | 12/1999 | Smith et al. | |
| 7,614,931 | B2 * | 11/2009 | Nuttall | A63H 18/026 |
| | | | | 446/423 |
| 7,913,447 | B1 * | 3/2011 | Jabro | A01M 23/10 |
| | | | | 43/64 |
| 9,826,729 | B2 * | 11/2017 | Albaugh | A01M 23/04 |
| 10,278,378 | B1 * | 5/2019 | Wallendorff | A01M 23/02 |
| D890,442 | S * | 7/2020 | Watson | D30/119 |
| 2010/0132244 | A1 * | 6/2010 | Ridge | A01M 23/10 |
| | | | | 43/71 |
| 2015/0128480 | A1 * | 5/2015 | Pinder | A01M 23/04 |
| | | | | 43/69 |

OTHER PUBLICATIONS

Shawn Woods, "Teeter Totter Bucket Mouse Trap In Action with motion cameras," YouTube, available at https://www.youtube.com/watch?v=_cL-A3uJ_44 (Year: 2017).*

* cited by examiner

BUCKET MOUSE TRAP

FIELD

The technology described herein relates to a mouse trap that is configured to work with a bucket.

BACKGROUND

Mouse traps that utilize buckets to trap mice are known. A user takes a can or roller, such as a soup or beer can, places it on a rod, and couples the rod to the side walls of a bucket. Then the user builds a ramp, such as a wooden ramp, that leads to the top of the bucket. A user places bait on the can and the mouse takes a leap for it and ends up falling in the bucket because the can or roller spins as soon as the mouse hits it. The can is like a rolling log. Once the mouse touches the rolling log, the mouse falls off the log into the bucket. An example of this type of device is described in U.S. Pat. Nos. 5,528,852 to Sarff and 5,996,274 to Smith et al.

Other types of trapping mechanisms for forcing rodents into the bucket include cantilever beams, beams that collapse under the weight of the rodent, weighted beams, planks, plates that hang from a rope that extends across the bucket opening, bottles positioned to rock back and forth, and the like.

The present invention is an improvement on the above concepts.

SUMMARY

A bucket mouse trap is shown and described.

BRIEF DESCRIPTION OF THE DRAWING FIGURES

DETAILED DESCRIPTION

Figure 1:
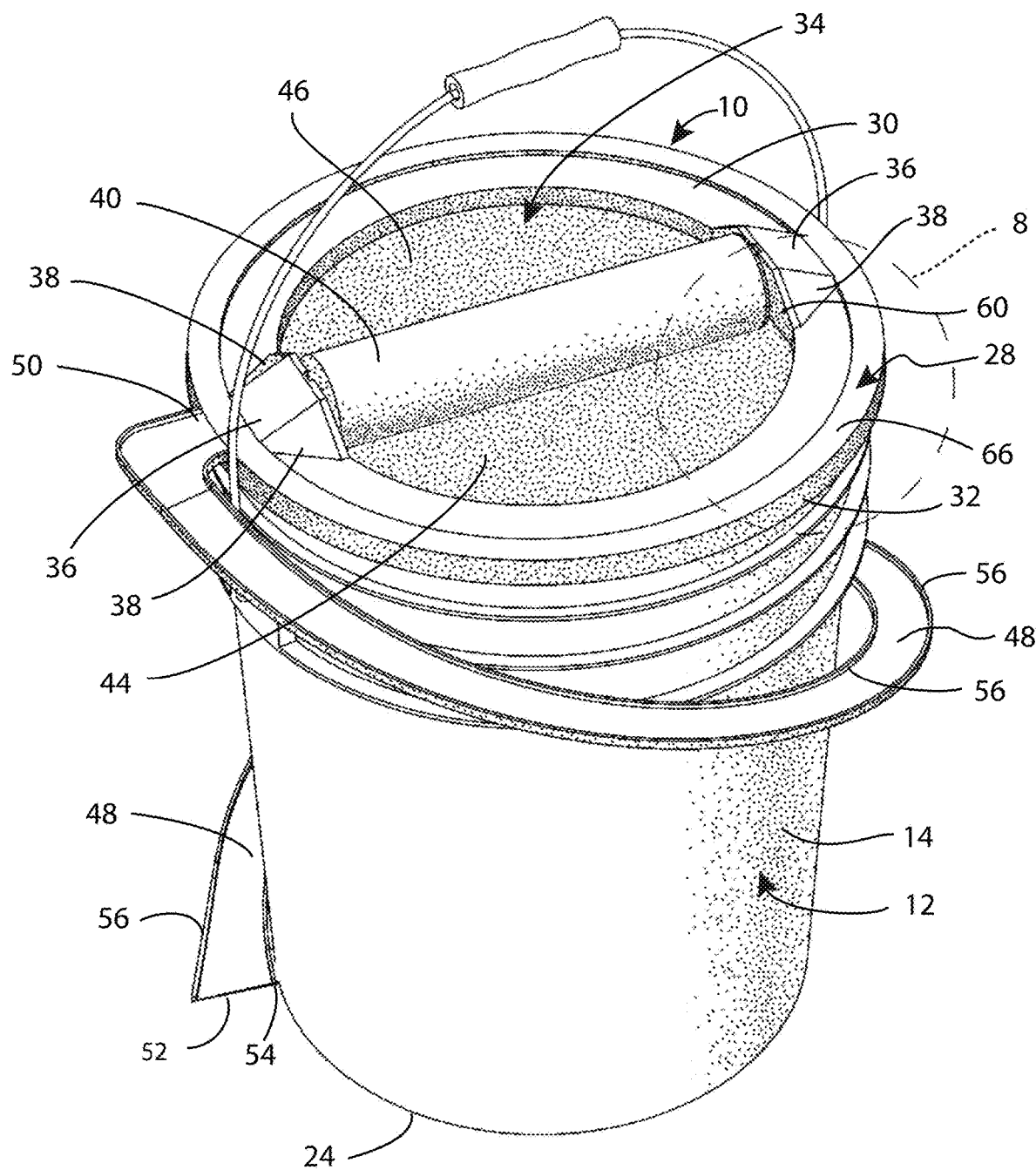
FIG. 1 is a perspective view of an example mouse trap installed on a bucket according to the invention.
Figure 2:
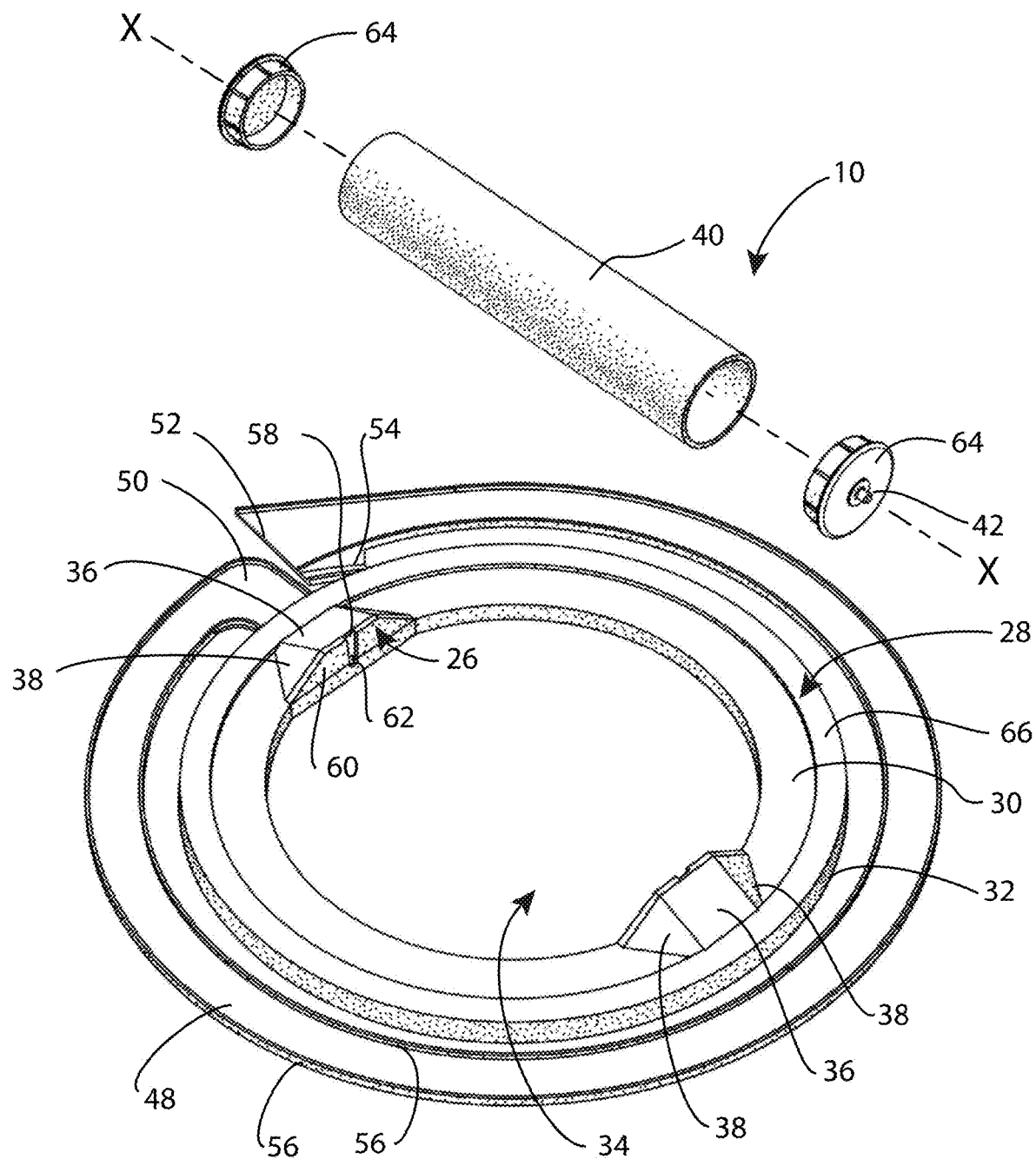
FIG. 2 is an exploded perspective view of the example mouse trap of FIG. 1, with the ramp being flattened prior to installation on a bucket.
Figure 3:
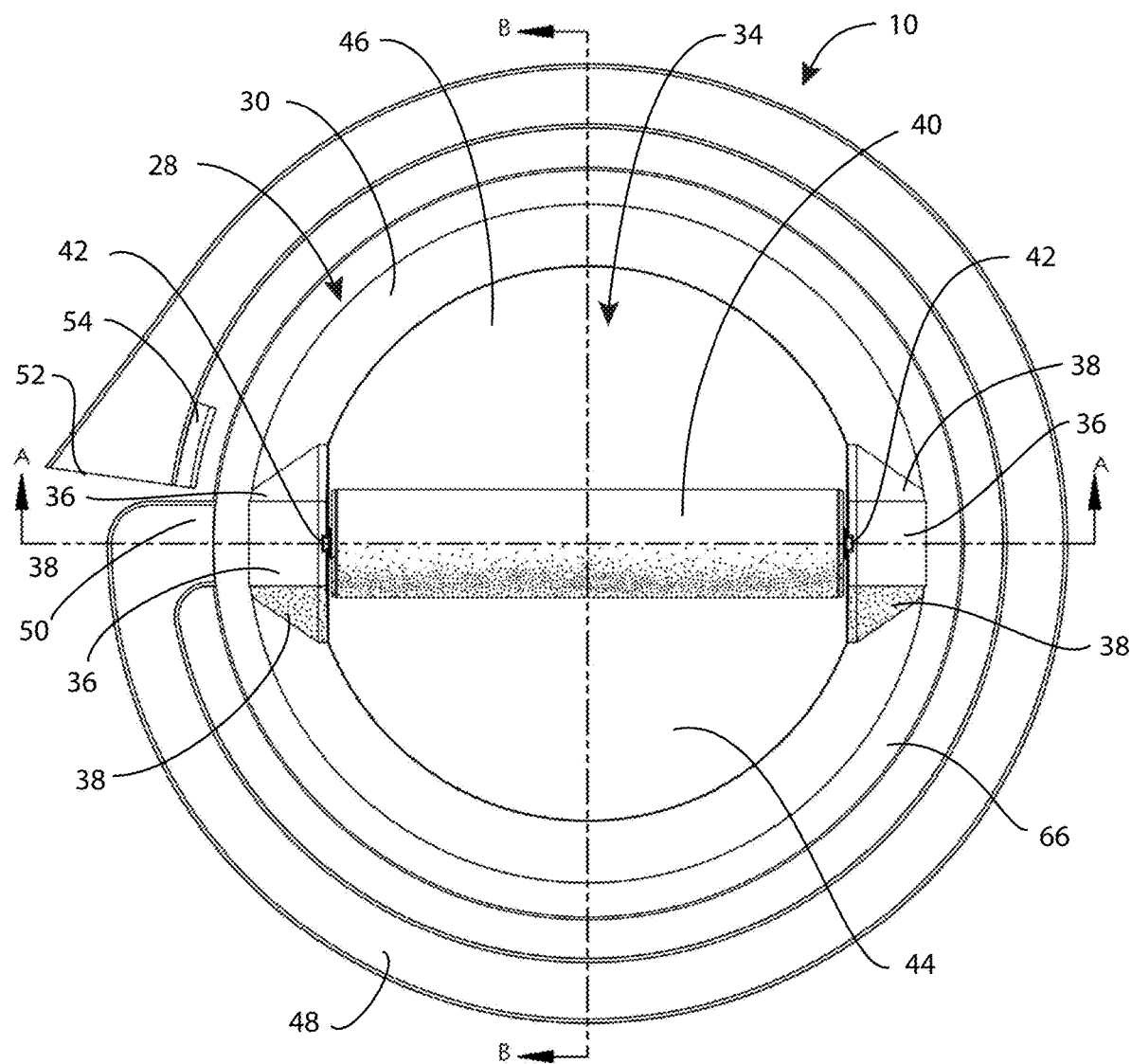
FIG. 3 is a top plan view of the example mouse trap of FIG. 1, prior to installation on a bucket.
Figure 4:
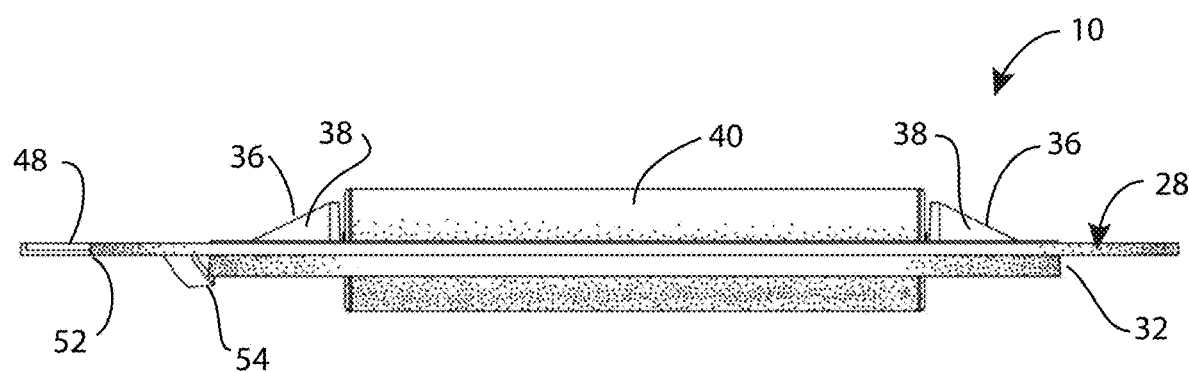
FIG. 4 is a front side view of the example mouse trap of FIG. 3.
Figure 5:
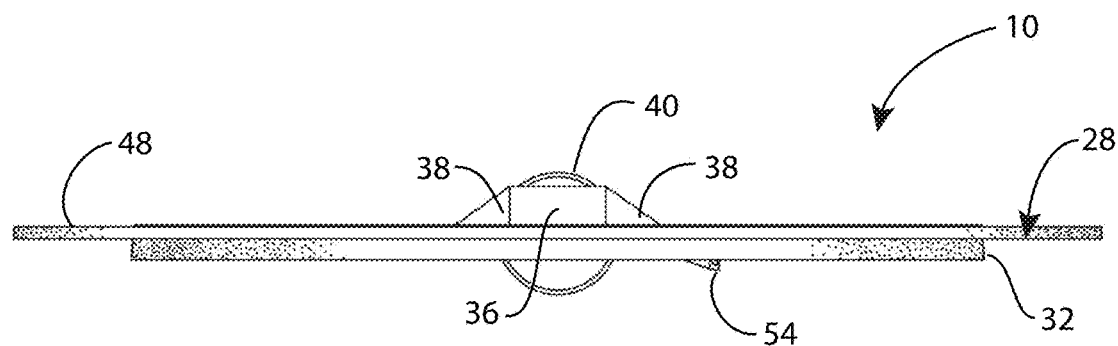
FIG. 5 is a right-side view of the example mouse trap of FIG. 3.
Figure 6:
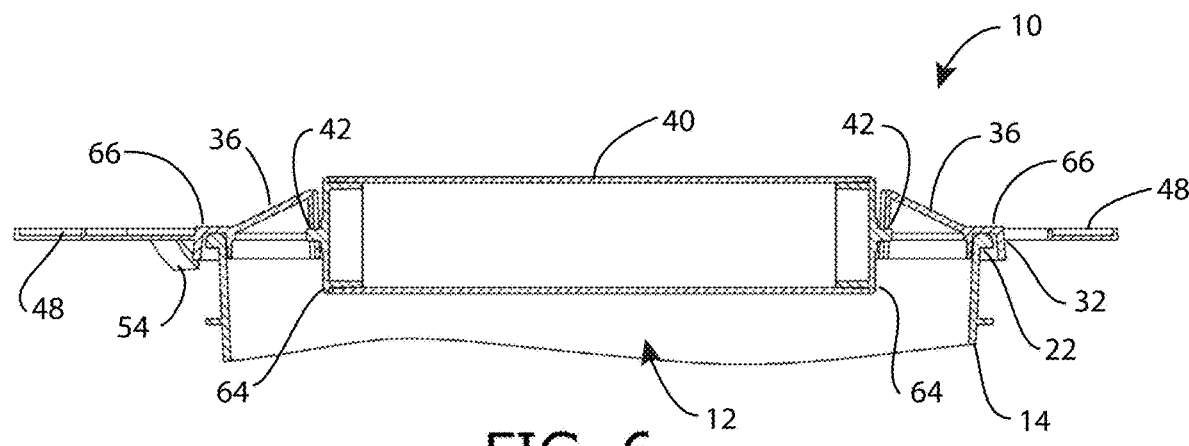
FIG. 6 is a cross-sectional front view taken at line A-A in FIG. 3.
Figure 7:
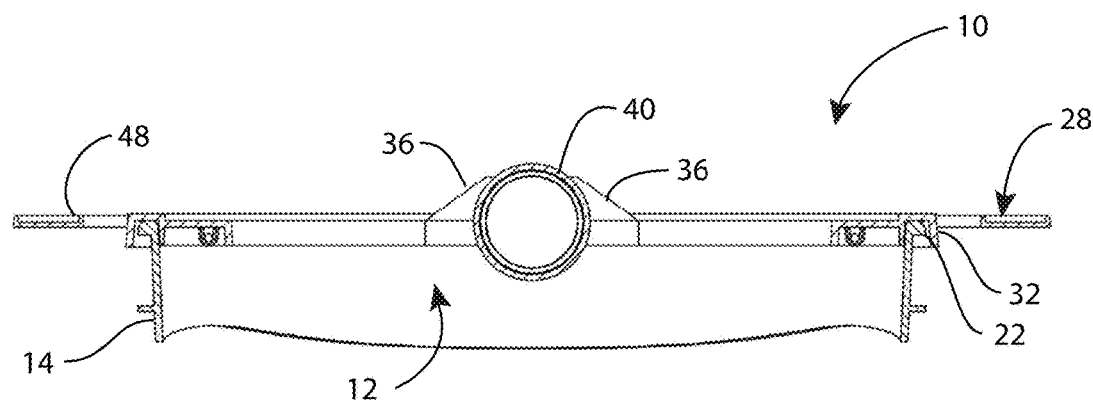
FIG. 7 is a cross-sectional right-side view taken at line B-B in FIG. 3.

The technology described herein relates generally to a mouse trap 10 that can be installed on a bucket 12 and used to trap mice inside the bottom of the bucket 12. Due to the nature of the side wall 14 of a bucket 12, e.g., smooth and vertical, once the mouse falls into the bucket 12, it cannot climb out. Thus, the bucket 12 serves as an effective tool for capturing the mouse. Then the user can do what they wish with the mouse, e.g., capture and release, etc. When the user employs capture and release, the bucket is empty. Alternatively, a user may wish to employ a kill mode which involves putting water in the bottom of the bucket.

Three different embodiments of a mouse trap 10 used on a bucket 12 are described herein. All embodiments have certain features in common, with two of the embodiments having additional features designed to aid in luring a mouse to step into the trap 10. The first embodiment is shown in FIGS. 1-7. This embodiment is the "base" model that the other embodiments are based upon. The second embodiment is shown in FIGS. 9-13. In this embodiment, the trap 10 also includes spring loaded doors 16 that lure the mouse into thinking they can walk on the doors, but once they do so, the doors 16 flip downwardly, forcing the mouse to fall into the bucket 12. The doors 16 serve an additional function of preventing larger mice from jumping out of the bucket. The third embodiment is shown in FIGS. 14-18. In this embodiment, the trap 10 includes yieldable members 18, such as a plastic film that has slits 20 extending through portions of the film 18. When a mouse attempts to walk on the film 18, the slits 20 will open, forcing the mouse to fall into the bucket 12. Each embodiment will be discussed in greater detail below.

The embodiments described herein are shown in use with a 5-gallon standard sized bucket 12. While not shown, the mouse trap 10 can be adapted to seat on other sized buckets, such as standard kitchen buckets. Alternatively, the lower surface of the mouse trap 10 could be configured to seat on differently sized buckets, if desired. The bucket 12 has a rim 22 at the upper end thereof and a bottom edge 24 at the bottom end thereof. The bucket 12 also has a circular side wall 14 that encloses the interior of the bucket 12. The bucket 12 has an opening at the top end thereof that opens into the interior of the bucket, with the rim 22 encircling the opening at the top end of the bucket 12.

FIGS. 1-7 depict a first embodiment of the mouse trap 10. The mouse trap 10 includes a top cover ring 28 that forms a platform or ledge 30. The top cover ring 28 seats on the rim 22 of the bucket 12. The top cover ring 28 is circular and matches the shape of the underlying bucket 12. The top cover ring 28 is shown as having a lip 32 that extends downwardly along the side wall 14 of the bucket 12. Alternatively, the top cover ring 28 could simply seat on the bucket rim 22 without a lip 32. The lip 32 helps to stabilize the top cover ring 28 on the upper end of the bucket 12. The top cover ring 28 is circular and has a central opening 34. The top cover ring 28 has inclined surfaces 36, 38 positioned at opposite ends of the top cover ring 28 and a roller 40 is positioned between the inclined surfaces 36, 38. The roller 40 includes outwardly extending spindles 42 or pins positioned at opposite ends of the roller 40 and the spindles 42 seat in receptacles 26 positioned adjacent the inclined surfaces 36, 38. The roller 40 rotates or spins around the spindles 42. The roller 40 extends across the central opening 34 to define a front bucket 44 opening and a rear bucket opening 46. These openings 44, 46 are positioned between the roller 40 and the top cover ring 28 such that a semi-circular opening 44, 46 is defined on opposite sides of the roller 40.

The mouse trap 10 includes a ramp 48 that may be built into the side of the top cover ring 28 at a coupling point 50. The ramp 48 is otherwise not coupled to the top cover ring 28 other than at the coupling point 50. The ramp 48 may be integral with the top cover ring 28 or could be joined to the top cover ring 28 by sliding or snapping in place. In the embodiment shown, the ramp 48 is integral with the top cover ring 28 and is formed simultaneously in the same mold as the top cover ring 28.

The material of the mouse trap 10 is flexible but sturdy. When the top cover ring 28 is positioned over the upper end of the bucket 12, the ramp 48 is flexible to permit it to fall along the side wall 14 of the bucket 12 to form a spiral ramp 48. The spiral ramp 48 extends from the bottom edge 24 of the bucket 12 to the rim 22 of the bucket 12. The ramp 48 has a length and forms an angle of ascent that allows a mouse to easily walk up the ramp 48.

The ramp 48 has a generally consistent width, except at the bottom end 52, where it is shown as having a slightly wider width. The width could vary or could be uniform along the length of the ramp 48. For example, the width could be wider at the bottom and gradually transition to narrower at the top. The ramp shown has a width of approximately 2¼ inches at the bottom end and approximately 1½ inches at the top end. The width in approximately the middle of the ramp is about 1".

The ramp 48 includes a hook 54 at the bottom end 52 of the ramp 48 on an inner side thereof. This hook 54 is shaped and sized to allow the hook 54 to be hooked under the bucket 12. By hooking the ramp 48 under the bucket 12, it helps to stabilize the ramp 48, permitting easier access by mice up the ramp 48. The hook 54 also helps to hold the ramp 48 in place in close association with the side wall 14 of the bucket 12. The spiral ramp 48 substantially hugs the side wall 14 of the bucket 12. In alternative embodiments, the ramp 48 is slightly spaced from the outer wall 14 of the bucket 12. The ramp 48 could be spaced from the side wall 14 of the bucket 12 in different sections along the length of the ramp 48. For example, the ramp 48 could be slightly spaced in the middle of the bucket 12 or could be tightly positioned at the top and bottom ends of the bucket 12. The ramp 48 also has upwardly extending side edges 56 that serve as guard rails to keep the mouse on the ramp 48 when it is climbing up the ramp 48.

The top end of the ramp 48 includes a substantially 90 degrees turn at the coupling point 50 where the ramp 48 attaches to the top cover ring 28. This turn directs the mouse onto the top cover ring 28 and up the inclined surfaces on the top cover ring 28. The angle associated with the coupling point 50 could instead be other than 90 degrees, such as about 120 degrees, or some greater or lesser angle.

One of the inclined surfaces 36, 38 is directly adjacent the top of the ramp 48 and the other 36, 38 is positioned on the opposite side of the top cover ring 28. The inclined surfaces have top inclined walls 36 and side inclined walls 38. The top surface 36 extends upwardly at an angle and the side surfaces 38 extend downwardly from the sides of the top surface 36 until they meet the upper surface/rim of the top cover ring 28. The inclined surfaces 36, 38 on each side make triple-sided inclined surfaces. The inclined surfaces 36, 38 on the top cover ring 28 help to usher a mouse onto the roller 40. The top of the roller 40 is at substantially the same height as the top of the top inclined surface 36. Alternatively, the top of the roller 40 can be slightly elevated above the top of the top inclined surface 36. If the mouse decides to leave the inclined surfaces 36, 38 before stepping on the roller 40, it can walk around the top cover ring 28 to the opposite side of the ring 28, so that it can step onto the roller 40 on the opposite side. The inclined surfaces 36, 38 are conducive to allowing the mouse to step off the inclined surfaces 36, 38, either onto the roller 40, or onto the platform 30 of the top cover ring 28.

In an alternative embodiment, the roller 40 could be at the same height as the ledge 30 or the top cover ring 28. The roller could alternatively be recessed slightly relative to the ledge 30 or the top cover ring 28.

A notch 58 is defined on an inner side 60 of each of the top inclined surfaces 36. The notch 58 extends downwardly adjacent the central opening 34 of the top cover ring 28 to a point where it is substantially level with the upper surface of the top cover ring 28. A recess 62 is defined at the lower end of the notch 58. The recess 62 is deeper in dimensions than the depth of the notch 58. The notch 58 is used for receiving the spindles 42 of the roller 40. The notch 58 helps to direct the spindles 42 of the roller 40 into the recess 62 at the bottom end of the notch 58. The recess 62 has a diameter that is greater than a diameter of the spindle 42 to permit the roller 40 to freely rotate in the recesses. The notch 58 may be vertical and could be v-shaped, as shown, to assist the user in guiding the spindles 42 into the respective recesses.

The roller 40 may be a hollow cylindrical tube with two ends caps 64 for holding the spindles 42. The end caps 64 seat inside the inner diameter of the cylindrical tube and can be press-fitted in position so they are not easily removable. Other types of connections can be used to couple the end caps 64/spindles 42 to the roller 40. The roller 40 is shown as having a constant outer diameter. The roller 40 could alternatively have a more varied shape, such as undulating or other shapes, which may be conducive to forcing a mouse to fall off the roller 40. The roller 40 could be a unitary part with the end caps 64 being unitary with the roller 40 and with spindles 42 molded into the roller 40. Alternatively, an axle (not shown) could be positioned down the center of the roller 40 with hubs or spokes for centering the roller 40 on the axle, with the ends of the axle seating in the recesses 62 at the bottom of the notches 58 in the inclined surfaces 36, 38. The roller 40 has a longitudinal axis X-X about which the roller rotates. The spindles 42 are positioned at opposite ends of the roller along the longitudinal axis. There may be times when the roller could be off-balance, such as when the longitudinal axis X-X is not perfectly aligned along the center. In this case, the roller may tip when enough of the mouse's weight is on a side of the roller but would otherwise be stable allowing a mouse to move more to the center of the roller. Ordinarily, the roller will be round, and the axle will align with the longitudinal axis, or the roller without an axle will spin around a longitudinal axis.

The top cover ring 28 also has upwardly extending edge surfaces on the top surface thereof that form a rim 66 that serves the function of guard rails to help keep the mouse inside the outer edge of the top cover ring 28. The outer rim 66 has a height that is substantially equivalent to the lower end of the top inclined surfaces 36. The platform 30 may be flat (e.g., parallel to a surface that the bucket 12 seats on). Alternatively, the platform 30 could be sloped to direct a mouse into the central opening 34 if it steps onto the platform 30.

The underside of the top cover ring 28 may have ridges or recesses for assisting in seating the top cover ring 28 on the rim 22 of a bucket 12. The ridges could be sized to permit the top cover ring 28 to snap into position on the bucket rim 22. Alternatively, the underside of the top cover ring 28 could be sized to permit the top cover ring 28 to be placed on top of the rim 22, without any significant holding power associated with the connection. The lower surface could include stabilizing members to assist in coupling the top cover ring 28 to the rim 22

Figure 8:
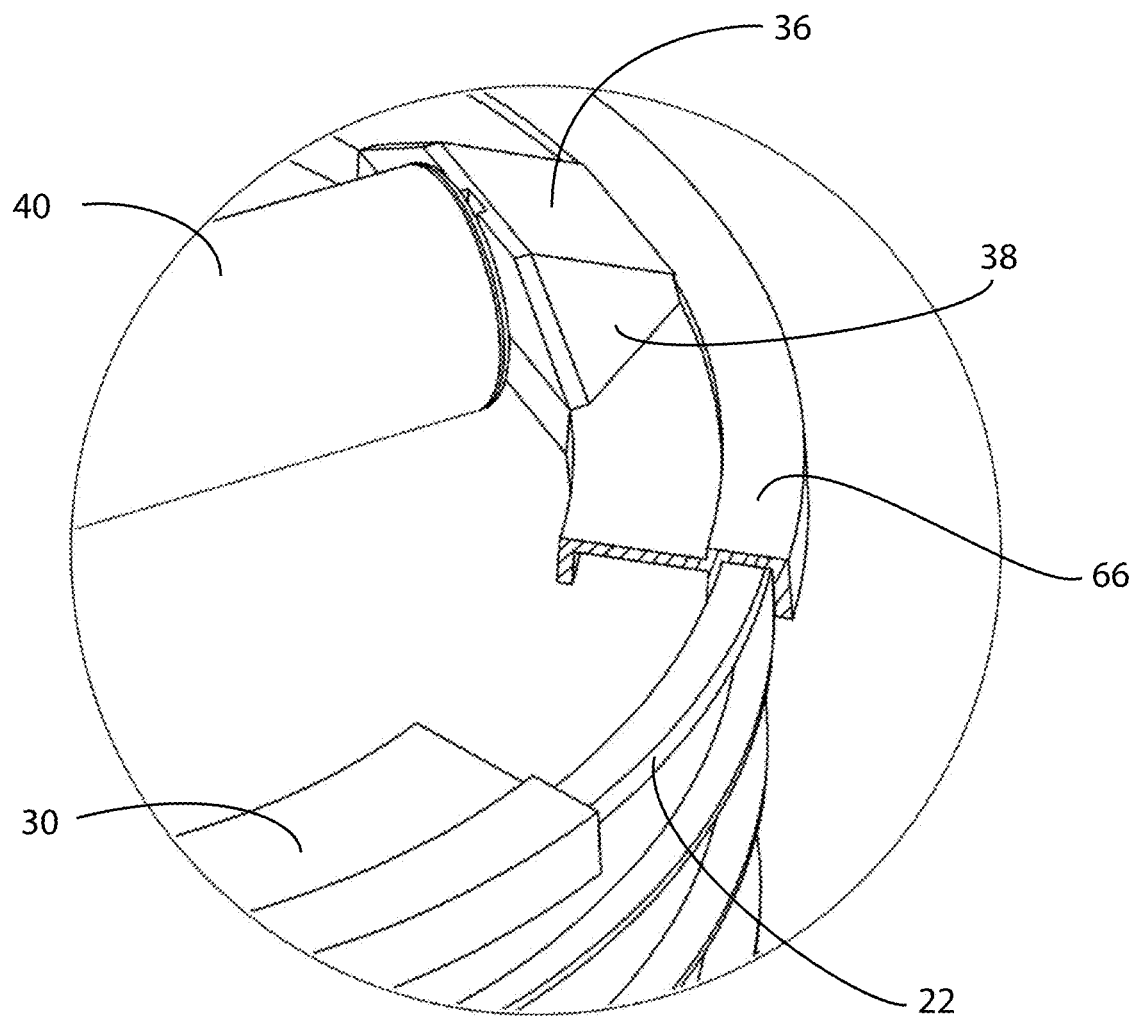
FIG. 8 is an enlarged cross-sectional, cut-away perspective view of the bucket rim taken at circle 8 in FIG. 1.
Figure 9:
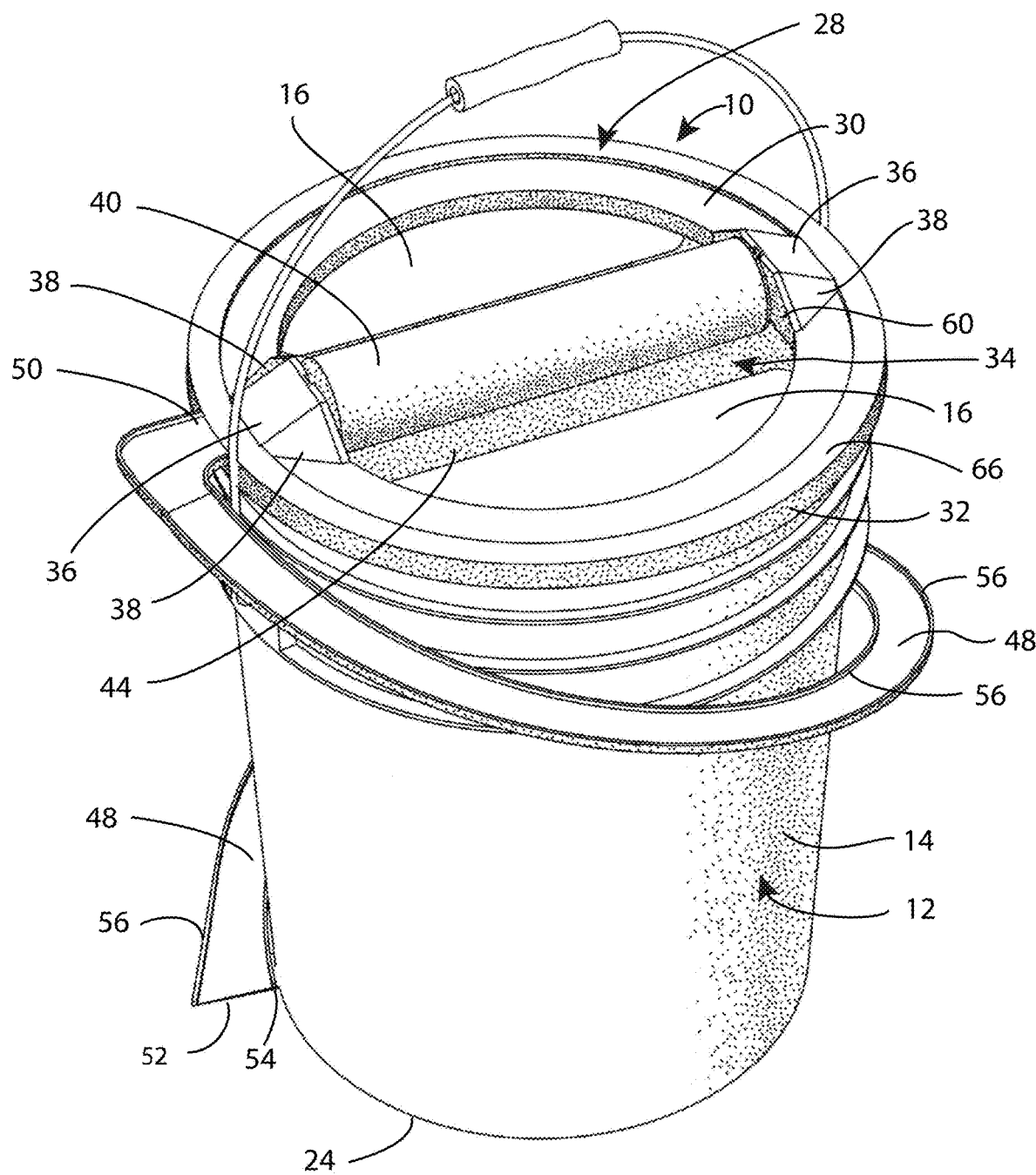
FIG. 9 is a perspective view of an alternative embodiment of the mouse trap installed on a bucket according to the invention, where the mouse trap includes spring loaded doors.
Figure 10:
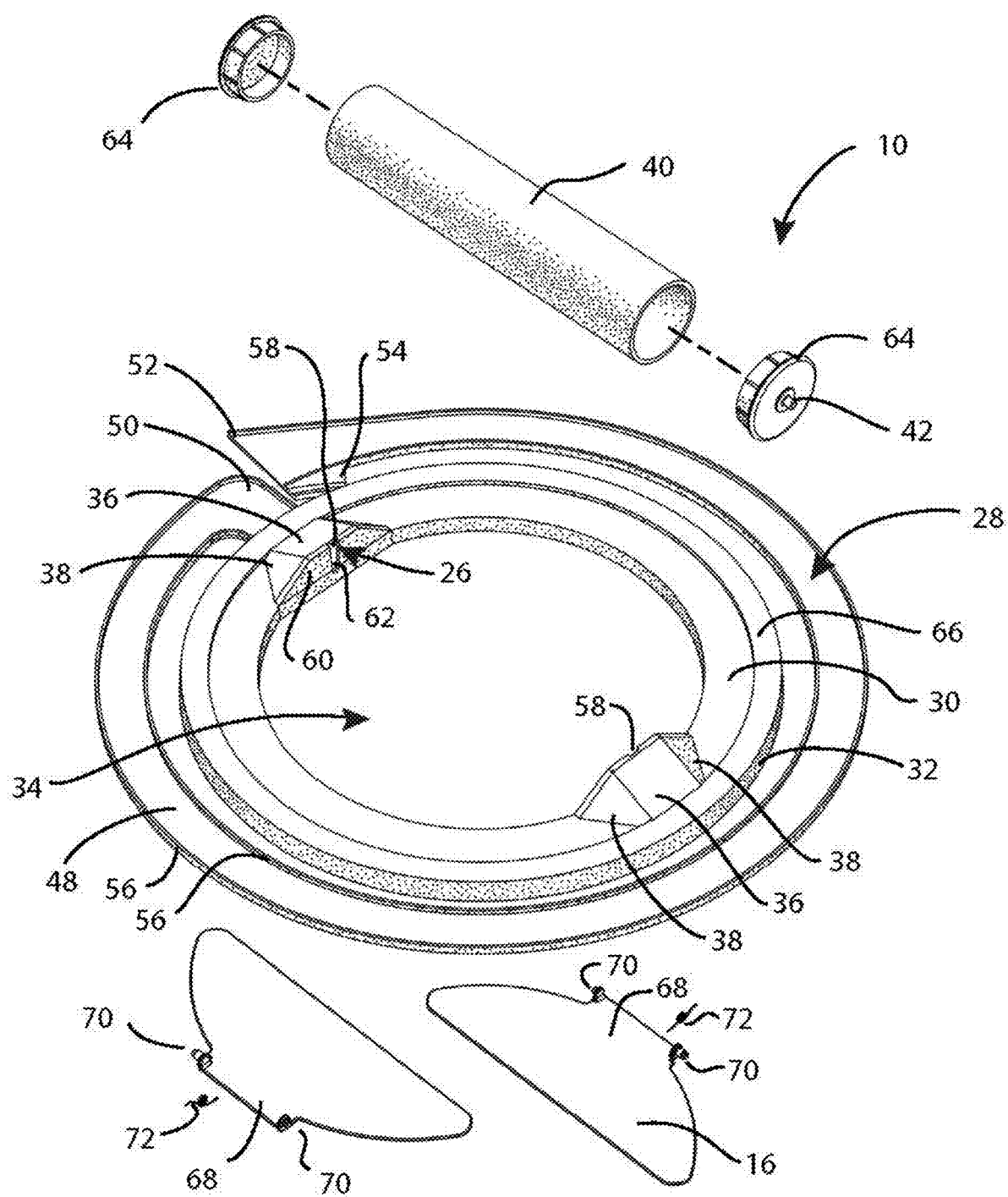
FIG. 10 is an exploded perspective view of the mouse trap of FIG. 9, with the ramp being flattened prior to installation on a bucket.
Figure 11:
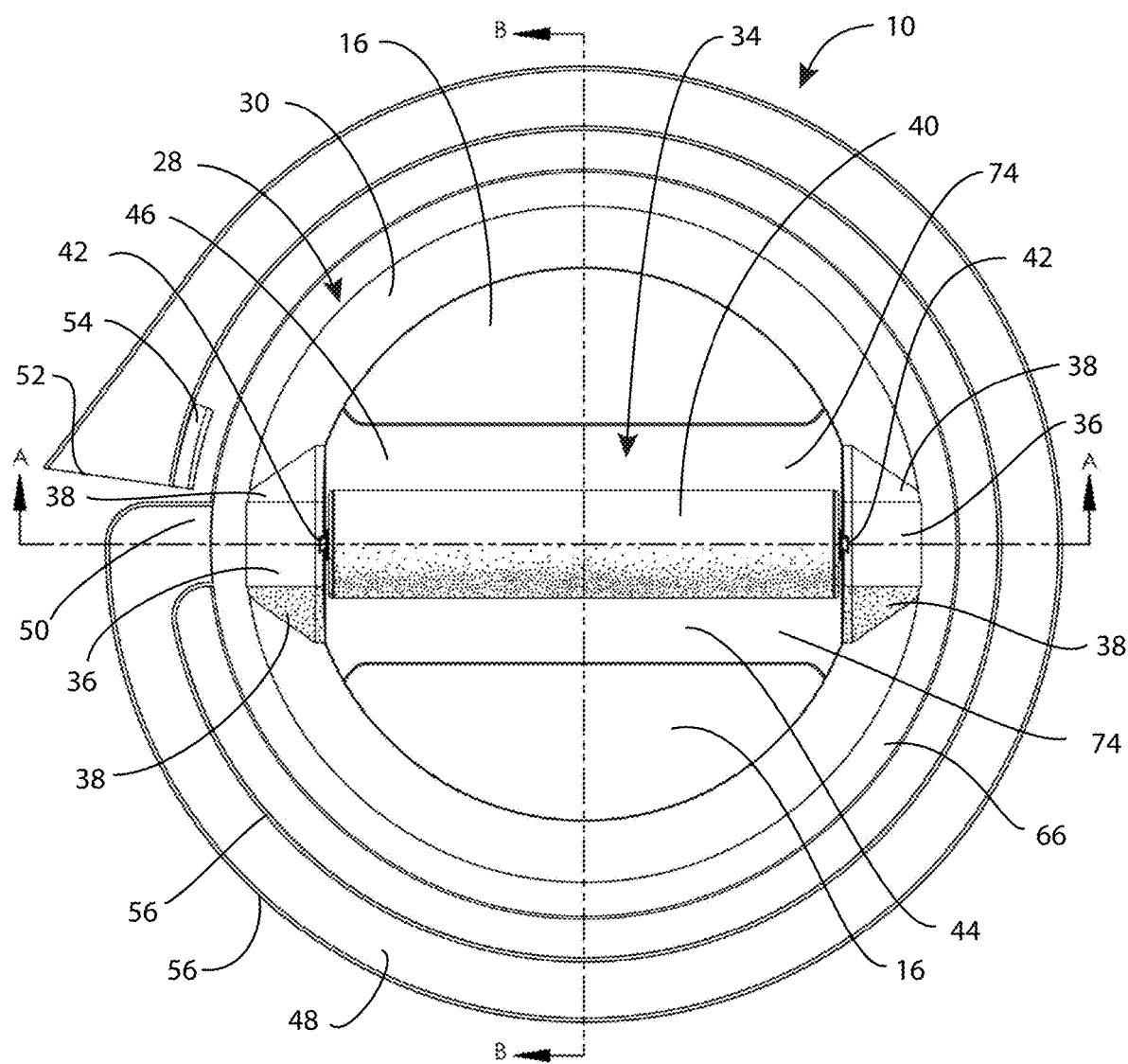
FIG. 11 is a top plan view of the mouse trap of FIG. 9, with the doors installed.
Figure 12:
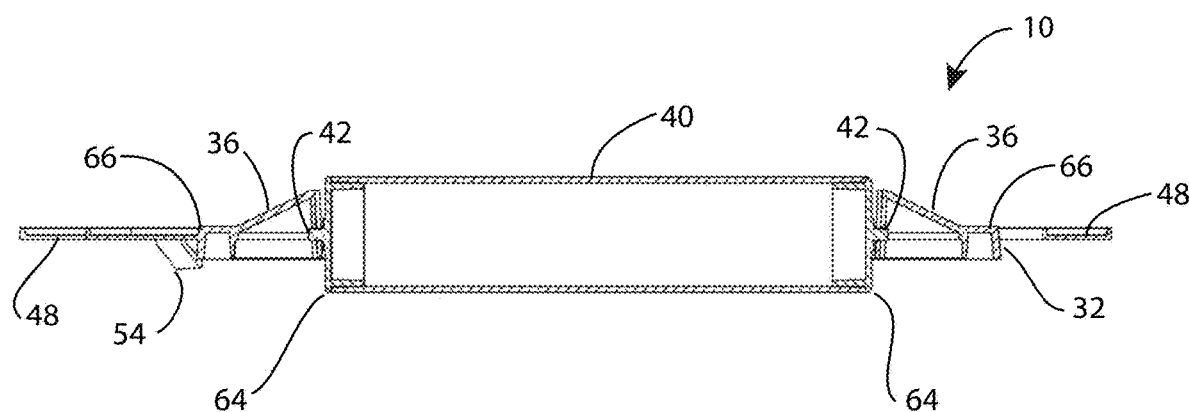
FIG. 12 is a cross-sectional front view taken at line A-A in FIG. 9.
Figure 13:
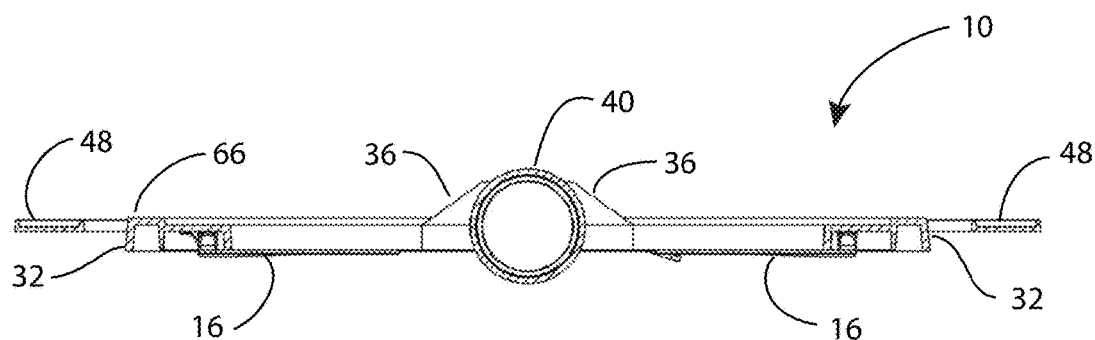
FIG. 13 is a cross-sectional right-side view taken at line B-B in FIG. 9.
Figure 14:
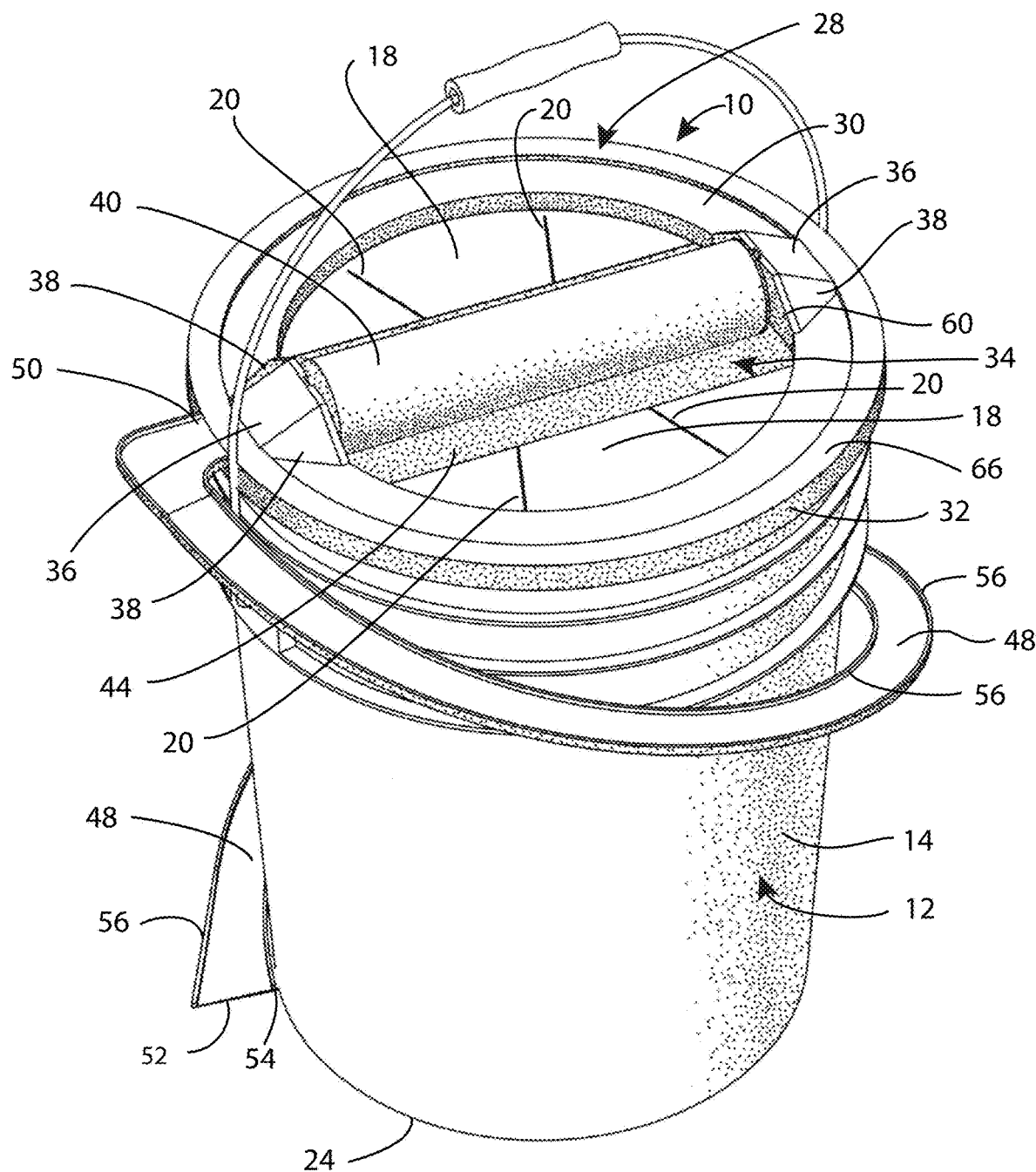
FIG. 14 is a perspective view of another embodiment of the mouse trap installed on a bucket according to the invention, where the mouse trap includes yielding sections adjacent the roller.
Figure 15:
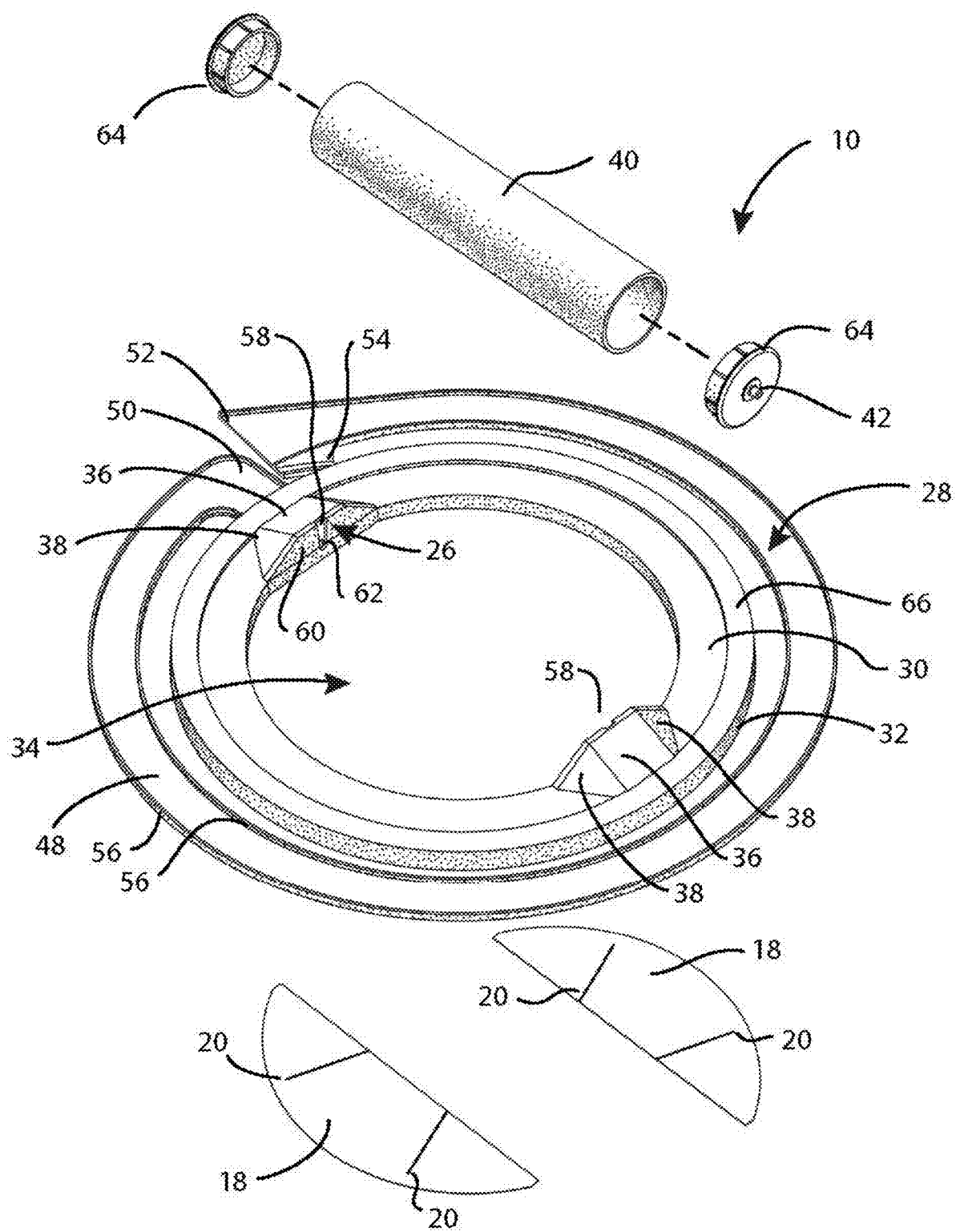
FIG. 15 is an exploded perspective view of the example mouse trap of FIG. 14, with the ramp being flattened prior to installation on a bucket.
Figure 16:
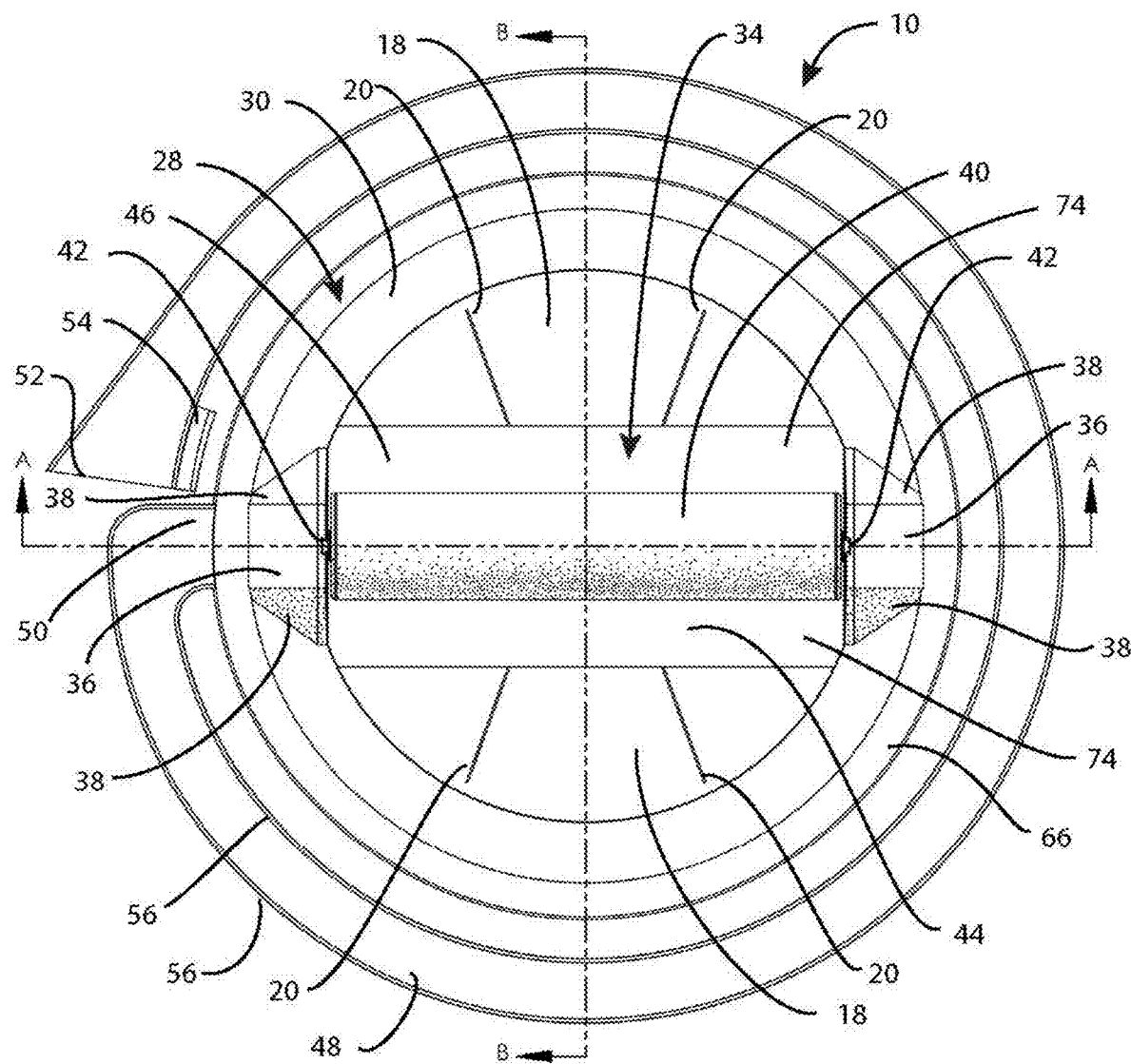
FIG. 16 is a top plan view of the mouse trap shown in FIG. 14.
Figure 17:
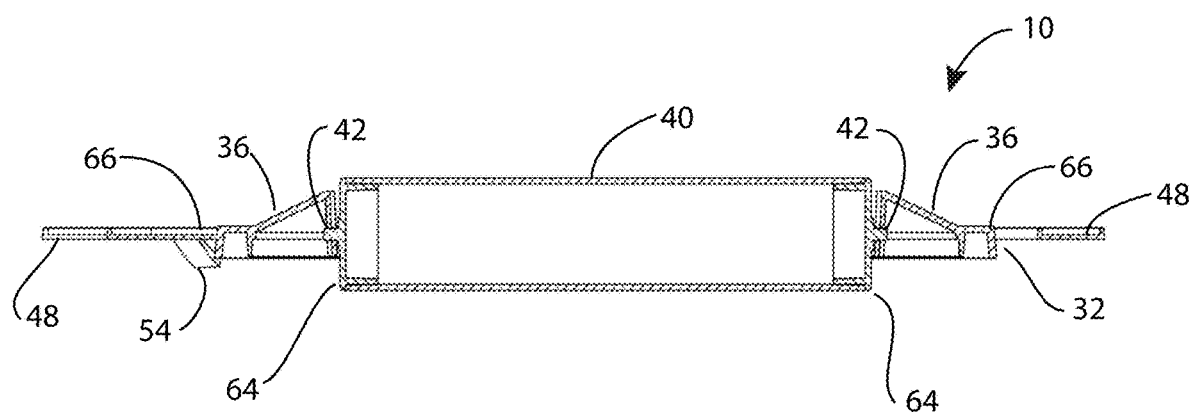
FIG. 17 is a cross-sectional front view of the mouse trap of FIG. 14.
Figure 18:
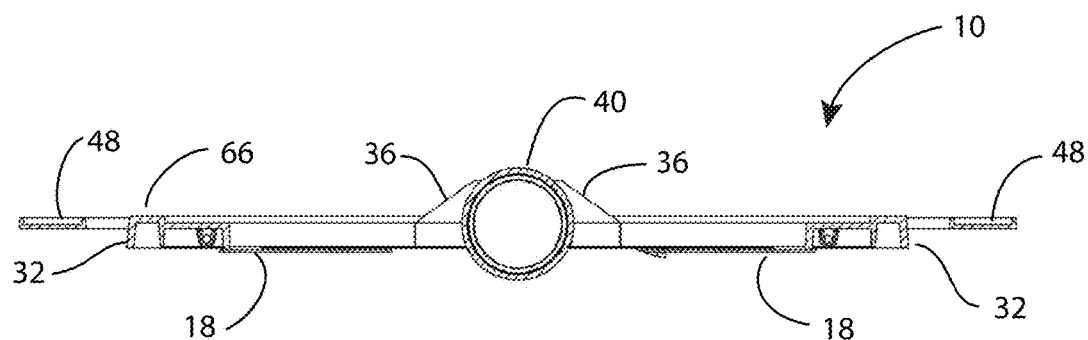
FIG. 18 is a cross-sectional right-side view of the mouse trap of FIG. 14.

FIG. 8 depicts a view of the top cover ring 28 installed on the rim 22 of the bucket. The top cover ring 28 sits on the rim 22 of the bucket, without a snap or press fit, although a snap or press fit could be utilized, if desired. The top cover ring includes a platform or ledge 30 that is substantially flat and parallel to the bucket rim 22. The top cover ring 28 also includes a rim 66 that is positioned adjacent the ledge 30. The rim 66 includes two downwardly extending members that are sized to seat on the edge of a bucket rim 22. The two downwardly extending members form rings that surround the rim 22, with one downwardly extending member being positioned inside the rim 22 and the other downwardly extending member being positioned outside the rim 22. A recess is formed between the two downwardly extending members and the rim 66 of the top cover ring 28 for accepting the rim 22 of the bucket 12.

FIGS. 9-13 depict an alternative embodiment that is substantially the same as FIGS. 1-7 but includes spring-loaded doors 16 to cover at least part of the top cover ring opening 34. As shown, this embodiment includes two doors 16 that are substantially semi-circular in shape, with a flange 68 on an outer edge thereof that includes connectors 70 for coupling the flange 68 to the underside of the top cover ring 28. Each door 16 is associated with a coil spring 72 that permits the respective door 16 to be held in a normally closed position to cover part of the opening 34 of the bucket 12 in large part. When weight is applied to the door 16, such as when a mouse steps on the door 16, the doors 16 will rotate downwardly so that the mouse slides into the bucket 12. Door 16 also provides an additional benefit in that it helps to prevent mice from jumping out of the bucket 12 when water is not positioned in the bottom of the bucket during catch and release mode.

The connectors 70 shown on the flange 68 of each door 16 include one pin and one recess. The pin may mate with a recess defined on the underside of the top cover ring 28 and the recess may be coupled to a pin defined on the underside of the top cover ring 28 in a conventional manner that permits the door 16 to rotate upwardly and downwardly. Other types of connectors may be utilized. The spring 72 is sized such that when a mouse steps onto the door 16, the door 16 moves downwardly, forcing the mouse into the interior of the bucket 12. Thus, the spring 72 should permit movement based upon the typical weight of a mouse. A single spring 72 is shown per door, but multiple springs could be used if desired. The spring may be coupled between the door 16 and the underside of the top cover ring 28 in any conventional manner.

The doors 16 are sized to cover a majority of the opening 34. As shown best in FIG. 11, each door 16 covers approximately ⅔ or ¾ of the opening 34 on each side of the roller 40. There is open space 74 adjacent the roller 40. This space 74 allows the mouse to fall into the bucket 12 when it falls off the roller 40.

FIGS. 14-18 depict another alternative embodiment that is substantially the same as FIGS. 1-7 and 9-13 but includes resilient flaps 18 that cover at least part of the opening 34. As shown, this embodiment includes two flaps 18 that are substantially semi-circular in shape. The flaps 18 seat under the top cover ring 28. The flaps 18 include slits 20 that extend outwardly from an inner edge of the top cover ring 28. In the embodiment shown, the flaps 18 include two slits 20 that extend about ¾ to $⅞^{th}$ of the way into the flap 18. The flap 18 is designed to provide some support for a mouse when it steps onto the flap 18, but as the mouse moves inwardly toward the roller 40 (where the peanut butter is positioned, the slits 20 open and the mouse falls into the bucket 12. The flaps 18 may be simply placed under the top cover ring 28 such that the weight of the top cover ring 28 against the top end of the bucket 12 helps to trap the flaps 18 in place. Alternatively, the flaps 18 may be adhered or otherwise attached to the top cover ring 28 along the outer circular edge of the flaps 18.

The plastic material utilized may be clear plastic or an opaque material. Materials other than plastic may also be used, such as cloth.

The flaps 18 are sized to cover a majority of the opening 34. As shown best in FIGS. 15-16, each flap 18 covers approximately ⅔ or ¾ of the opening 34 on each side of the roller 40. There is open space 74 adjacent the roller 40. This space 74 allows the mouse to fall into the bucket 12 when it falls off the roller 40. The slits 20 extend outwardly from an inner edge of the film 18. The slits may extend all the way from the inner edge of the film 18 to the ledge 30 or may extend part of the way to the ledge 30. As shown, the slits extend at least 75% of the way to the ledge 30 from the inner edge of the film 18.

Figure 19:
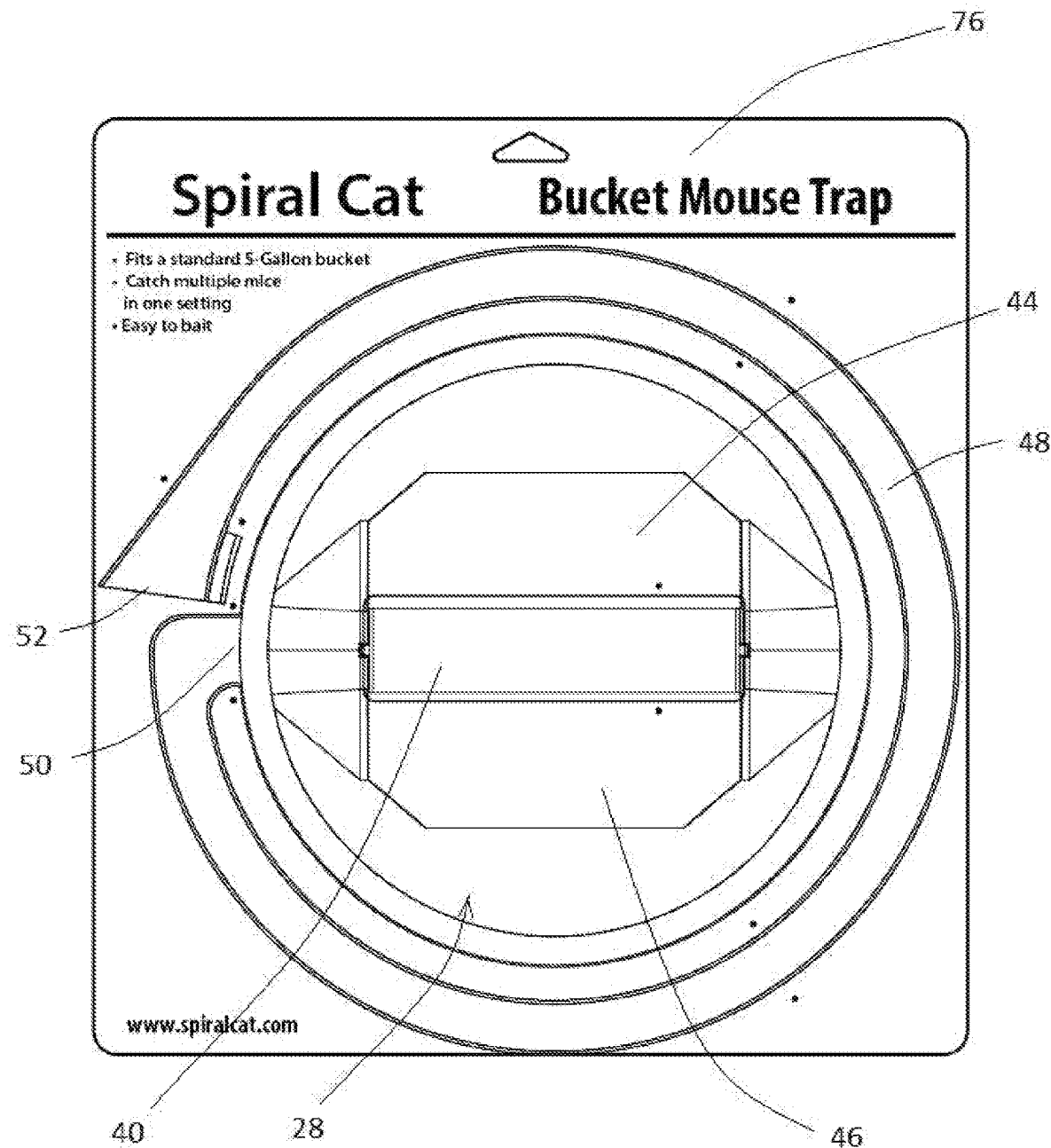
FIG. 19 is a top plan view, similar to that of FIG. 3, showing the mouse trap installed on a selling card.

FIG. 19 depicts an example selling card 76 with the bucket mouse trap 10 installed on the card 76. The bucket mouse trap 10 may be sold in a flattened position to save space during shipping. Also, due to the nature of the spiral ramp 48, the ramp 48 encircles the top cover ring 28 when folded flat, making the form factor of the product on the selling card 76 compact, which is a positive selling feature for retailers who need to stock and store products. Also, consumers will appreciate that the form factor is compact and not unwieldy. Also, in the embodiment of the mouse trap 10 shown in FIG. 19, the central opening 34 of the top cover ring 28 is round in shape. Alternatively, the opening 34 could be octagonally shaped or other shapes. Other shapes for the opening 34 may alternatively be used, such as oval or square. Also, the central opening 34 does not need to be centrally located on the top cover ring 28, if desired. It can be positioned off center or on one side or end.

To use the bucket mouse trap 10, the user places the trap 10 on top of a 5-gallon (or other size) bucket 12 and extends the spiral ramp 48 down the side of the bucket 12. At the bottom edge 24 of the bucket 12, the user hooks the ramp 48 under the bucket 12 to hold it in place. If the roller 40 is not already installed, the user must also install the roller 40. If the doors 16 are utilized, and are not installed, the doors 16 must be installed. If flaps 18 are utilized and not installed, the flaps 18 should be installed. Once the above has been completed, the mouse trap 10 is ready for use.

The user then places a small dab of peanut butter at the entrance to the ramp 48 and near the middle and/or top of the ramp 48. Peanut butter is also positioned in the center of the roller 40. The peanut butter at the bottom of the ramp 48 will entice a mouse to run up the ramp 48. The peanut butter in the middle of the ramp 48 will reward the mouse for coming up the ramp 48, and then the peanut butter on the roller 40 will entice the mouse to attempt to step onto the roller 40. Once the mouse steps on the roller 40, the roller 40 will rotate and the mouse will fall into the bucket 12. The mouse trap 10 is easy to bait to attract more mice.

The bucket mouse trap 10 of the present invention is advantageous in that it permits the capture of multiple mice in a single trap 10 and does not need to be reset between catches. It can catch many mice after being set only once. The bucket trap 10 design can be modified into either a kill trap or a humane live trap, so you can trap and release. Placement of water in the bottom of the bucket creates a kill trap. No poisons or chemicals are needed to kill or trap mice.

The design is simple in that all the user must do is install the top cover ring 28 on the top end of a 5-gallon bucket 12. The spiral ramp 48 is then positioned around the sides of the bucket 12 such that it extends from the bottom edge 24 to the top of the bucket 12. The ramp 48 is compact and fits substantially tightly along the walls of the bucket 12.

The various parts of the mouse trap 10 may be made of polypropylene, including the top cover ring 28, the tube roller 40, and the end caps of the roller 40. Other materials may alternatively be used, as known by those of skill in the art.

A mouse trap 10 for use with a bucket 12 having an upper rim 22, a side wall 38, and a bottom edge 24 includes a top portion 28 and a spiral ramp 48. The top portion 28 has a ledge 30 for seating adjacent or over the rim 22 of the bucket 12. The top portion 28 has an opening 34 with a movable roller 40 disposed across the opening 34. The ledge 30 substantially surrounding the opening 34. The spiral ramp 48 is coupled to an outer edge of the top portion 28. In use, the ramp 48 extends down the side wall 38 of the bucket 12 in a spiral manner from an area near or at the rim 22 of the bucket 12 to the bottom edge 24 of the bucket 12.

The opening 34 in the top portion 28 may be substantially round. The opening 34 in the top portion 28 may have a width, and the roller 40 extends substantially across the entire width of the opening 34. The roller 40 may have spindles 42 positioned at opposite ends thereof. The roller 40 may spin on the spindles 42 in the opening 34 in the top portion 28.

The roller 40 may be shaped to accept bait for attracting a mouse and the opening 34 in the top portion 28 may have a shape that is round. The ledge 30 of the top portion 28 may include at least one inclined surface 36, 38 that is positioned adjacent an end of the roller 40. The at least one inclined surface 36, 38 may be substantially aligned, at a lower edge thereof, with the top portion 28. An upper edge of the inclined surface may be substantially aligned with the outer diameter of the roller 40. The at least two inclined 36, 38 surfaces may be positioned on the top portion 28, with an inclined surface 36, 38 being positioned adjacent each end of the roller 40.

The ledge 30 may include a lip 32 extending downwardly from the outer extent of the ledge 30 for holding the top portion 28 securely on the upper rim 22 of the bucket 12. The bucket 12 may have a round opening 34 at the upper rim 22 thereof. The ledge 30 may have an outer perimeter that is substantially round for mating with the round opening 34 of the bucket 12.

The spiral ramp 48 may be coupled to and extends outwardly from an outer extent of the top portion 28 and may lie in substantially the same plane as the top portion 28 at the point 50 where it is coupled to the top portion 28. The spiral ramp 48 may be coupled to the top portion 28 via a living hinge. Alternatively, due to the flexible nature of the materials, a living hinge may not be required. The spiral ramp 48 may be flexible such that when the mouse trap 10 is applied to an upper rim 22 of a bucket 12, the ramp 48 is not supported and extends down around the side wall 14 of the bucket 12 until an end of the spiral ramp 48 touches a surface upon which the bottom of the bucket 12 rests. The spiral ramp 48 may have a hook 54 coupled to a lower end thereof for attaching the spiral ramp 48 to the bottom edge 24 of the bucket 12. The spiral ramp 48 may have a bottom end that is wider than a top end of the spiral ramp 48. The spiral ramp 48 may have upwardly extending side edges on opposites sides of the spiral ramp 48.

When the mouse trap 10 is in a resting uninstalled position, the mouse trap 10 may collapse into a substantially flat or planar member.

The mouse trap 10 may also include at least one spring-loaded door 16 coupled to the top portion 28 and covering at least part of the opening 34 of the top portion 28. The opening 34 of the top portion 28 may be substantially round. The at least one spring loaded door 16 may be substantially semi-circular in shape to cover less than half of the opening 34 of the top portion 28. Two doors 16 may be provided and the doors 16 may have a flange 68 coupled to the semicircular portion thereof, with the flange including hinging elements for hinging the doors 16 to the top portion 28.

The mouse trap 10 may also include at least one flap 18 coupled to the top portion 28 and covering at least part of the opening 34 of the top portion 28. The opening 34 may be substantially round, with the at least one flap 18 being substantially semi-circular in shape to cover less than half of the opening 34 of the top portion 28. The at least one flap 18 may have one or more slits 20 formed therethrough on an inner edge of the flap 18. Two flaps 18 may be provided and the flaps 18 may be adhered to a bottom surface of the top portion 28.

The spiral ramp 48 may lie closely adjacent to the side walls 38 of the bucket 12. The spiral ramp 48 may seat against the side walls 38 of the bucket 12. The top cover ring may have a width of about 12½ inches. The width of the opening inside the top cover ring may have a width of about 9¼ inches. The length of the roller may be about 8 5/16 inches. The height of the inclined surface between the roller and the rim 66 of the top cover ring is about ½ inch. The length of the ramp is about 45½ inches. The width of the ramp at the top thereof is about 1½ inches. The width of the ramp in the middle of the ramp is about 1 inch. The width of the ramp at the bottom end of the ramp is about 2¼ inches. The length of the hook is about 1⅛ inches. The height of the ledge of the top cover ring relative to the rim of the top cover ring, from the top surface 66 to the surface of ledge 30 is about 3/32 inches. The height of the lip of the top cover ring on the vertical wall is about 9/16 inches. The total width of the device, when flat, is about 15¾ inches. The total thickness of the device, when flat, with the roller installed, is about 1¾ inches. The total thickness of the device, when flat, without the roller installed is about 1 1/16 inches. Other dimensions may be utilized. The dimensions stated herein are ideal for a specific type of bucket. When other bucket types are utilized, the dimensions may necessarily need to be revised to fit the bucket.

The term "substantially," if used herein, is a term of estimation.

While various features are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. A mouse trap for use with a bucket having an upper rim, a side wall, and a bottom edge comprising:
   a top portion having a ledge for seating adjacent or over the upper rim of the bucket configured for supporting the weight of a mouse thereon, said top portion having an opening with a movable roller disposed across the opening, with the roller being positioned at least in part at a height above the ledge, with the ledge substantially surrounding the opening, the roller having longitudinal ends adjacent the ledge with portions that lead a mouse onto the roller via the longitudinal ends of the roller;
   wherein the portions that lead the mouse onto the roller are one or more inclined surfaces each positioned adjacent one of the longitudinal ends of the roller, wherein the one or more inclined surfaces are substantially aligned, at a lower edge thereof, with the top portion, and an upper edge of the one or more inclined surfaces is in a substantially same horizontal plane as an outer diameter of the roller, and wherein the ledge is substantially planar except at the one or more inclined surfaces; and
   a spiral ramp coupled to an outer edge of the top portion, with said ramp, in use, extending down the side wall of the bucket in a spiral manner from an area near or at the upper rim of the bucket to the bottom edge of the bucket.

2. The mouse trap of claim 1, wherein the opening in the top portion is centrally disposed and has a width, and the roller extends across the entire width of the opening.

3. The mouse trap of claim 1, wherein the roller has spindles positioned at opposite ends thereof, and the roller spins on said spindles in the opening in the top portion, and the roller is shaped to accept bait for attracting a mouse.

4. The mouse trap of claim 1, wherein the ledge includes a lip extending downwardly from an outer edge of the ledge for holding the top portion securely on an upper rim of the bucket that has a round opening at the upper rim thereof, and the ledge has an outer perimeter that is substantially round for mating with the round opening of the bucket.

5. The mouse trap of claim 1, wherein the spiral ramp is coupled to and extends outwardly from an outer edge of the top portion and lies in substantially the same plane as the ledge where it is coupled to the top portion.

6. The mouse trap of claim 1, wherein the spiral ramp is coupled to the top portion and is flexible such that when the mouse trap is applied to the upper rim of the bucket, the ramp flexes and bends to extend down around the side wall of the bucket until it touches a surface upon which the bottom edge of the bucket rests.

7. The mouse trap of claim 6, wherein the spiral ramp has a hook coupled to a lower end thereof for attaching the spiral ramp to the bottom edge of the bucket.

8. The mouse trap of claim 1, wherein the spiral ramp has a bottom end that is wider than a top end of the spiral ramp.

9. The mouse trap of claim 1, wherein the spiral ramp has upwardly extending side edges on opposites sides of the spiral ramp.

10. The mouse trap of claim 1, wherein, in a resting uninstalled position, the mouse trap collapses into a substantially flat or planar member.

11. The mouse trap of claim 1, further comprising at least one spring-loaded door coupled to the top portion and covering at least part of the opening of the top portion, with the opening being substantially round and with the at least one spring loaded door being substantially semi-circular in shape to cover less than half of the opening of the top portion.

12. The mouse trap of claim 11, wherein the at least one spring-loaded door is two doors, and the two doors each have a flange coupled thereto, with each of the flanges including hinging elements for hinging the doors to the top portion.

13. The mouse trap of claim 11, wherein the spiral ramp lies closely to the side wall of the bucket or seats against the side walls of the bucket.

14. The mouse trap of claim 1, further comprising at least one flap coupled to the top portion and covering at least part of the opening of the top portion, with the opening being substantially round and with the at least one flap being substantially semi-circular in shape to cover less than half of the opening of the top portion, with the at least one flap having one or more slits formed therethrough on an inner edge of the at least one flap.

15. The mouse trap of claim 14, wherein the at least one flap is two flaps, and the two flaps are adhered to a bottom surface of the top portion.

16. The mouse trap of claim 1, wherein the spiral ramp is height-adjustable such that it can be used for various height buckets, such that for taller buckets the ramp will be steeper and for shorter buckets the ramp will be less steep.

\* \* \* \* \*